United States Patent
Nakamura

(10) Patent No.: US 10,304,146 B2
(45) Date of Patent: May 28, 2019

(54) IMAGE GENERATION APPARATUS, IMAGE GENERATION METHOD AND PROGRAM

(71) Applicant: KYOCERA CORPORATION, Kyoto-Shi, Kyoto (JP)

(72) Inventor: Kazutaka Nakamura, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 212 days.

(21) Appl. No.: 15/327,603

(22) PCT Filed: Jul. 29, 2015

(86) PCT No.: PCT/JP2015/003826
§ 371 (c)(1),
(2) Date: Jan. 19, 2017

(87) PCT Pub. No.: WO2016/017172
PCT Pub. Date: Feb. 4, 2016

(65) Prior Publication Data
US 2017/0161848 A1   Jun. 8, 2017

(30) Foreign Application Priority Data
Jul. 29, 2014 (JP) ................................. 2014-154337

(51) Int. Cl.
*G08B 21/00* (2006.01)
*G06Q 50/06* (2012.01)
(Continued)

(52) U.S. Cl.
CPC ............ *G06Q 50/06* (2013.01); *G06F 13/00* (2013.01); *G06Q 10/00* (2013.01); *H02J 3/06* (2013.01);
(Continued)

(58) Field of Classification Search
CPC ..................................... G06F 1/00; H04L 1/00
See application file for complete search history.

(56) References Cited

U.S. PATENT DOCUMENTS

| | | | | |
|---|---|---|---|---|
| 2010/0064001 A1* | 3/2010 | Daily | ..................... | G06Q 30/02 709/203 |
| 2014/0188295 A1* | 7/2014 | Saito | ..................... | G05B 15/02 700/291 |
| 2015/0084785 A1* | 3/2015 | Lesbirel | ................. | G01D 4/006 340/870.02 |

FOREIGN PATENT DOCUMENTS

| | | |
|---|---|---|
| JP | 2002-199625 A | 7/2002 |
| JP | 2003-141217 A | 5/2003 |

(Continued)

OTHER PUBLICATIONS

Ministry of Economy, Trade and Industry, Power and Gas Division, Issues and responses Related to Promoting the Introduction of Smart Meters (Proposal), 13th Smart Meter System Review Conference, Nov. 26, 2013, Japan, Document No. 3, 18 pages.

(Continued)

*Primary Examiner* — Shirley Lu
(74) *Attorney, Agent, or Firm* — Procopio Cory Hargreaves and Savitch LLP

(57) ABSTRACT

The image generation apparatus (1) allows reduction in a load on the database of energy management apparatus, and includes a communication part (12) configured to acquire first use information on energy usage in a first period from a first server (2) that has information on the energy usage at a customer facility and acquire second use information in a second period later than the first period from a meter device (3) that is installed in the customer facility and measures energy usage; and a controller (11) configured to generate an image relating to use of energy by using the first use information and the second use information together.

20 Claims, 5 Drawing Sheets

(51) Int. Cl.
| | |
|---|---|
| *H02J 13/00* | (2006.01) |
| *G06F 13/00* | (2006.01) |
| *H02J 3/06* | (2006.01) |
| *H02J 3/38* | (2006.01) |
| *H04Q 9/00* | (2006.01) |
| *G06Q 10/00* | (2012.01) |

(52) U.S. Cl.
CPC .............. *H02J 3/381* (2013.01); *H02J 13/00* (2013.01); *H04Q 9/00* (2013.01); *H04Q 2209/60* (2013.01); *Y02D 10/14* (2018.01)

(56) References Cited

FOREIGN PATENT DOCUMENTS

| | | |
|---|---|---|
| JP | 2011-188620 A | 9/2011 |
| JP | 2014-032574 A | 2/2014 |

OTHER PUBLICATIONS

International Search Report dated Oct. 20, 2015 issued by the Japanese Patent Office in counterpart International Application No. PCT/JP2015/003826.

Written Opinion of the International Search Authority dated Oct. 20, 2015 issued by the Japanese Patent Office in counterpart International Application No. PCT/JP2015/003826.

Office Action dated Feb. 20, 2018 issued in counterpart Japanese Application No. 2016-538156.

\* cited by examiner

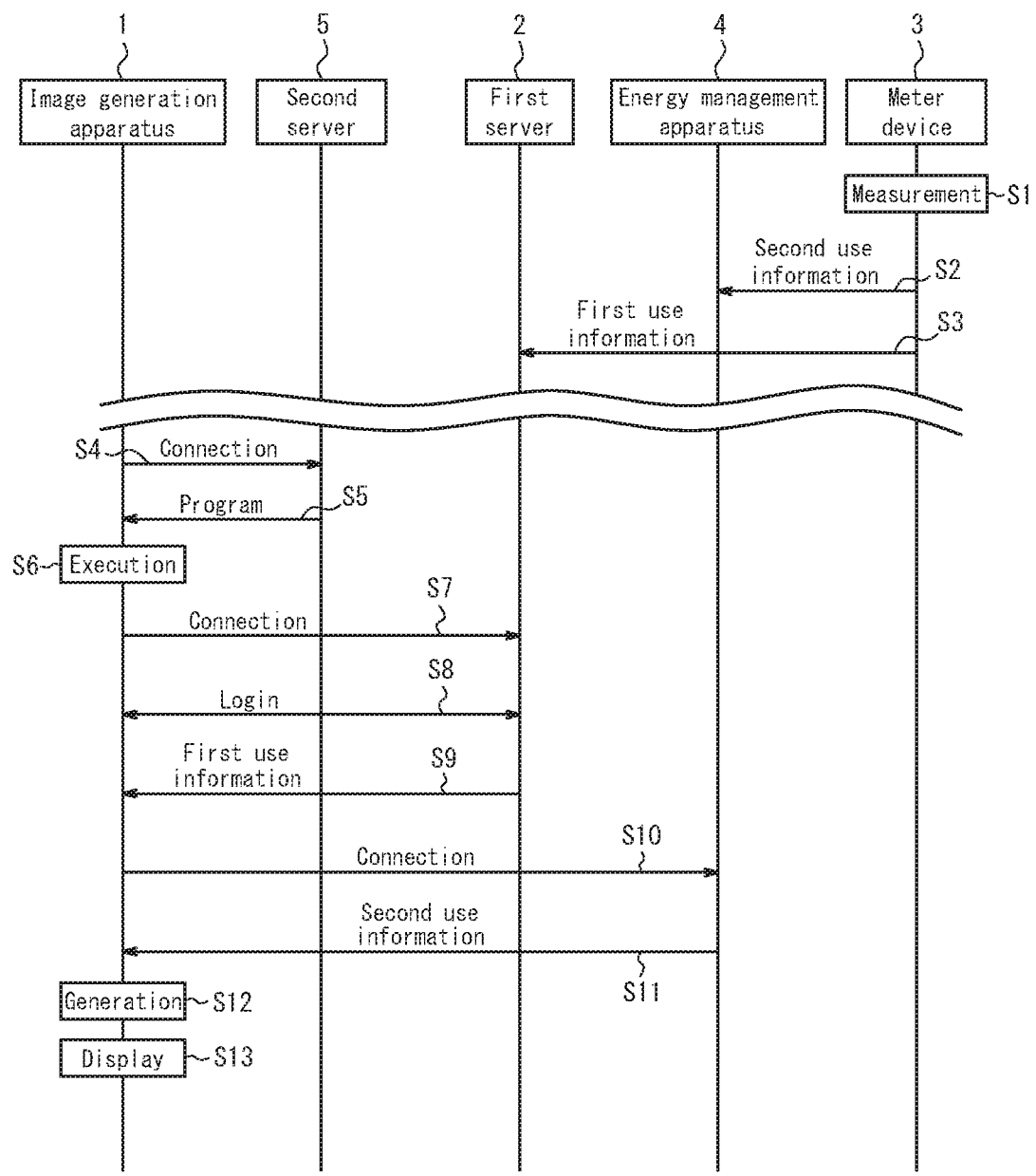

IMAGE GENERATION APPARATUS, IMAGE GENERATION METHOD AND PROGRAM

CROSS-REFERENCE TO RELATED APPLICATION

This application claims priority to and the benefit of Japanese Patent Application No. 2014-154337 filed on Jul. 29, 2014, the entire contents of which are incorporated herein by reference.

TECHNICAL FIELD

This disclosure relates to an image generation apparatus, an image generation method and a program.

BACKGROUND

A method has been known in which a dispersed power source, a loading device, water supply and gas supply are managed by an energy management apparatus (Home Energy Management System: HEMS) (see, for example, PTL 1). In PTL 1, the energy management apparatus acquires information on the object of management and stores the information in the database of the energy management apparatus.

CITATION LIST

Patent Literature

PTL 1: JP2014-032574 (A)

SUMMARY

Technical Problem

However, as with the method described in PTL 1, the method in which all of the information on the object of management is stored on the database of energy management apparatus increases a load on the database. The method also increases maintenance cost of the database of energy management apparatus.

It would therefore be helpful to provide an image generation apparatus, an image generation method and a program that can decrease a load on the database of energy management apparatus.

Solution to Problem

An image generation apparatus according to an embodiment of this disclosure includes a communication part configured to acquire first use information on energy usage in a first period from a first server that has information on the energy usage at a customer facility and acquire second use information in a second period later than the first period from a meter device that is installed in the customer facility and measures the energy usage; and a controller configured to generate an image on energy use by using the first use information and the second use information together.

An image generation method according to an embodiment of this disclosure has a step of acquiring, by a communication part, first use information on energy usage in a first period from a first server that has information on the energy usage at a customer facility and acquiring second use information in a second period later than the first period from a meter device that is installed in the customer facility and measures the energy usage and of generating, by a controller, an image on energy use by using the first use information and the second use information together.

A program according to an embodiment of this disclosure allows a computer to execute acquiring first use information on energy usage in a first period from a first server that has information on the energy usage at a customer facility and acquiring second use information in a second period later than the first period from a meter device that is installed in the customer facility and measures the energy usage and generating an image on energy usage by using the first use information and the second use information together.

Advantageous Effect

According to the image generation apparatus, the image generation method and the program of this disclosure, it is possible to reduce a load on a database of energy management apparatus.

BRIEF DESCRIPTION OF THE DRAWINGS

In the accompanying drawings:

FIG. 5 is a chart illustrating an operation flow of the image generation system illustrated in FIG. 1.

DETAILED DESCRIPTION

Figure 1:
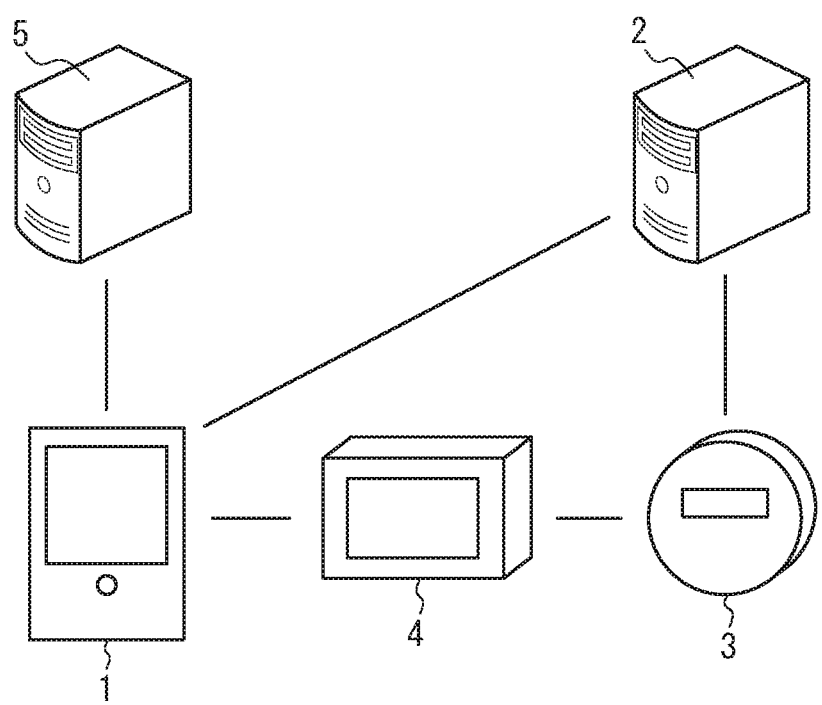
FIG. 1 is a schematic configuration diagram of an image generation system according to one embodiment of this disclosure.

As illustrated in FIG. 1, the image generation system includes an image generation apparatus 1, a first server 2, a meter device 3, an energy management apparatus 4 and a second server 5 connected through a network.

Each function of the image generation apparatus 1, the first server 2, the meter device 3, the energy management apparatus 4 and the second server 5 according to one embodiment of this disclosure is described below. It should be noted, however, that the description is not intended to eliminate the other functions they have.

Figure 2:
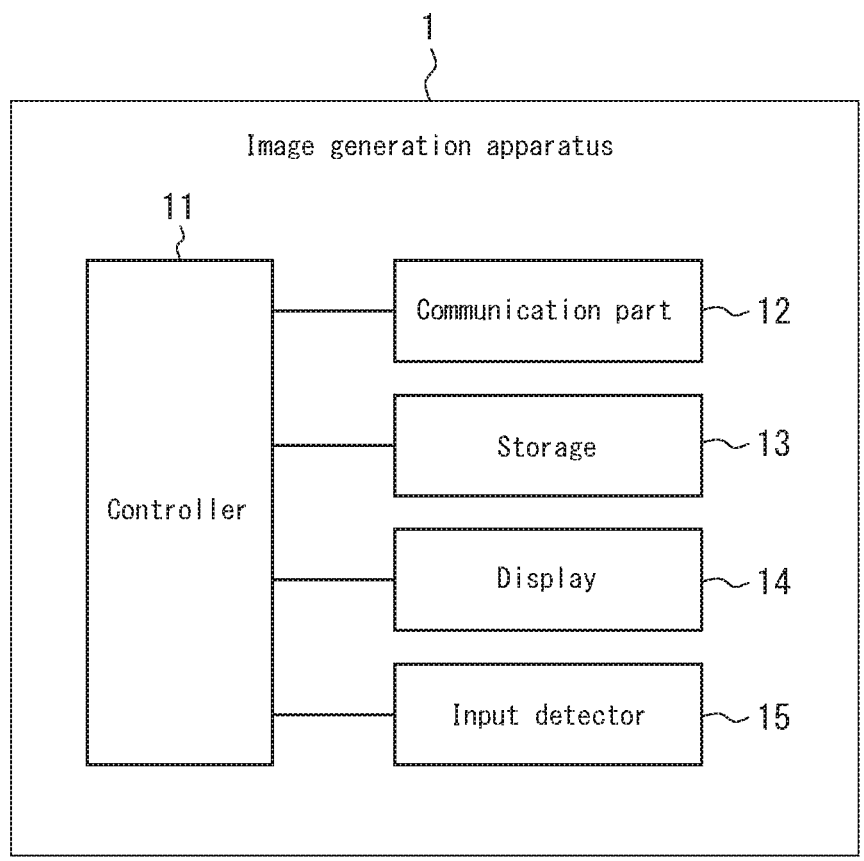
FIG. 2 is a functional block diagram of an image generation apparatus illustrated in FIG. 1.

As illustrated in FIG. 2, the image generation apparatus 1 is a tablet computer such as a personal computer, a smartphone, Personal Digital Assistant (PDA) or the like or a dedicated terminal. The image generation apparatus 1 includes a controller 11, a communication part 12, a storage 13, a display 14 and an input detector 15.

The controller 11 is a processor such as Central Processing Unit (CPU) or the like, and controls a variety of operations of the image generation apparatus 1. For example, the controller 11 generates an image on energy use by using the first use information acquired from the first server 2 and the second use information acquired from the meter device 3 together.

The first use information and the second use information are usage per utility time for the energy such as, for example, electricity, water, gas or the like at a customer facility. The first use information and the second use information are the information on the same subject. However, the second period, which is a target period of the second use information, is closer to the present than the first period, which is a target period of the first use information. The first use information and the second use information may be raw data, or image data indicating a graph or a figure. The first use information and the second use information may also be charge information. The charge information may be the charge based on the usage (charged corresponding to the usage), the charge based on flat rate or the charge based on flat metered rate in which a certain usage is included in the basic charge.

At least one of the first use information and the second use information may include at least one of electricity usage suppression amount and output suppression amount in a fixed period of time for electricity or the like, for example. The electricity usage suppression amount is the electricity usage that is reduced according to the demand response (DR) and the output suppression amount is a reduction amount of reverse power flow of such as, for example, solar cells, storage cells or fuel cells or the like based on the output suppression command. Furthermore, at least one of the first use information and the second use information may include only the information indicating that the demand response or the output suppression command has been conformed.

At least one of the first use information and the second use information may include the information on an incentive when the demand response or the output suppression command has been conformed. The incentive may be reduction amount or reduction ratio of electricity charge. Furthermore, at least one of the first use information and the second use information may include the information on the penalty based on the demand response or the output suppression command. As a penalty, a monetary charging is assumed, for example, which is imposed on customers when they fail to follow the electricity usage suppression amount determined by the demand response or when the reverse power flow is done in violation of the output suppression command.

The communication part 12 transmits/receives the information to/from the first server 2, the meter device 3 and the energy management apparatus 4 via at least one of a wired connection and a wireless connection. The communication part 12 acquires the first use information in the first period from the first server 2. In this embodiment, an explanation is given assuming that the communication part 12 receives the second use information in the second period indirectly from the meter device 3 via the energy management apparatus 4.

As another embodiment, the communication part 12 may acquire the second use information directly from the meter device 3 without via the energy management apparatus 4. When the communication part 12 acquires the second use information from the meter device 3, first, the image generation apparatus 1 reads out the credentials (the information including the ID information (login ID) and a password) stored on the storage 13 described later. Subsequently the communication part 12 logs in to the meter device 3 by using the read-out credentials and acquires the second use information corresponding to the credentials used. The ID information of the credentials to log in to the meter device 3 may be or may not be the same as the ID information of credentials to log in to the first server 2 described later. When they are the same ID information, the ID information is, for example, the customer management No. of the management company that manages the first server 2.

The communication part 12 also transmits/receives the information to/from the second server 5 via at least one of a wired connection and a wireless connection. The communication part 12 may acquire the first use information by acquiring a program from the second server 5 and by communicating with the first server 2 based on the acquired program (that is, by executing the program). The communication part 12 may acquire the second use information by acquiring a program from the second server 5 and by communicating with the energy management apparatus 4 based on the acquired program. The communication part 12 may acquire the first use information and the second use information based on a program stored on the storage 13.

The storage 13 can store the credentials used by the image generation apparatus 1 to log in to the first server 2. Furthermore, the storage 13 may serve as a workspace.

The display 14 is, for example, a liquid crystal display or an organic EL (Electro-Luminescence) display or the like, and displays an image generated by the controller 11 by using a web browser or the like.

The image generation apparatus 1 may arbitrarily include the display 14. When the image generation apparatus 1 does not include the display 14, the display of the energy management apparatus 4 described later may acquire an image generated by the controller 11 from the image generation apparatus 1 and display it.

The input detector 15 detects an input by the user who operates the image generation apparatus 1. The input detector 15 may be various kinds of input apparatus such as a dedicated controller, a keyboard, a mouse or the like. The input detector 15 can detect a user operation by which an object or the like is chosen by moving a cursor, a pointer, or the like, to the position of the object of icon displayed on the display 14, for example. The input detector 15 may also be a touch panel that detects a direct touch operation by the user.

Now referring back to the explanation of FIG. 1, the first server 2 is installed outside the customer facility. In particular, the first server 2 has the information on the energy usage such as electricity, water, gas, or the like, at the customer facility. The first server 2 provides a web service to the user.

The management company that manages the energy of the customer facility is, for example, an electric power company (an energy transmission and distribution company), a Power Producer and Supplier (PPS) or the like. The first server 2 acquires (collects) the first use information from the meter device 3 described later via what is called a route A or a route C for charging to the user who uses electricity. The standard used by the first server 2 for communicating with the meter device 3 is, for example, 920 MHz band wireless, Power Line Communication (PLC) and public wireless network. The frequency of acquiring the usage information by the first server 2 is four times a day, for example, which is relatively low frequency. Thus, the image generation apparatus 1 cannot acquire the latest usage information from the first server 2.

Here, the route A refers to the route between an electric power company (an energy transmission and distribution company) or PPS or the like and the meter device 3. Furthermore, the route B refers to the route between the meter device 3 and the energy management apparatus 4. Moreover, the route C refers to the route between an electric power company (an energy transmission and distribution company) or PPS or the like and a retailer or a public company (a third party).

The meter device 3 is, for example, a smart meter that is connected to a commercial power source and measures the electrical energy supplied from a commercial power source to a load. The meter device 3 is installed in a customer facility. The meter device 3 may measure not only the electrical energy of the current supplied from the commercial power source to the load but also the electrical energy of the reverse power flow from the dispersed power source (e.g. solar cells, storage cells or fuel cells or the like) to the commercial power source. However, the meter device 3 may be a meter that measures the usage such as water, gas, or the like. The meter device 3 measures the energy usage by the user and outputs it as the first use information and the second use information, respectively, to the first server 2 and the energy management apparatus 4. The meter device 3 may be a demand controller that monitors the usage status of the electricity and records and manages demand values.

The energy management apparatus 4 is, for example, Home Energy Management System (HEMS) and Cluster/Community Home Energy Management System (CEMS). The energy management apparatus 4 acquires the second use information from the meter device 3 via what is called a route B. The standard used by the energy management apparatus 4 for communication with the meter device 3 is, for example, Wi-SUN (Smart Utility Network), G3-PLC, or the like.

When the energy management apparatus 4 acquires the second use information from the meter device 3, the energy management apparatus 4 logs in to the meter device 3 by using the credentials stored, for example, and acquires the second use information corresponding to the credentials. The energy management apparatus 4 acquires the second use information in minutes, for example, which is relatively high frequency. Since the frequency of acquiring the second use information is higher than that of acquiring the first use information, the state where the energy management apparatus 4 and the meter device 3 are logged in may be kept.

The energy management apparatus 4 may include a display. The display of the energy management apparatus 4 is, for example, a liquid crystal display, an organic EL display, or the like. In this case, the display of the energy management apparatus 4 may serve as a display that acquires an image generated by the controller 11 of the image generation apparatus 1 and displays it. The display of the energy management apparatus 4 may not be provided inside the energy management apparatus 4, and may be connected to the energy management apparatus 4 from outside.

The second server 5 can provide a program configured to generate an image. The program includes, for example, the tag information such as HTML or the like that specifies a destination such as, for example, the first server 2 or the energy management apparatus 4 and a script such as JavaScript® described together with the tag information or the like.

The tag information and the script may specify the image generation procedures. The image generation apparatus 1 that has acquired the first use information and the second use information generates a dynamic web page, based on the tag information, for example, using the script.

The image generation processing performed by the image generation system according to one embodiment of this disclosure is described below.

[Image Generation Processing]

The image generation apparatus 1 connects (accesses) to the second server 5 by a user operation or a preset automatic operation. After connecting, the second server 5 outputs a program to the image generation apparatus 1. The image generation apparatus 1 that has acquired the program connects to the first server 2 based on the program. After connecting, the image generation apparatus 1 reads out the credentials from the storage 13. The image generation apparatus 1 logs in to the first server 2 by using the read out credentials.

When logging in, the image generation apparatus 1 may log in to the first server 2 by using the credentials acquired by the input detector 15 through the user operation, without reading out the credentials stored on the storage 13.

After logging in, the image generation apparatus 1 acquires the first use information on the energy usage in the first period at the customer facility corresponding to the credentials.

The image generation apparatus 1 also connects to the energy management apparatus 4 based on the program acquired from the second server 5. After connecting, the energy management apparatus 4 outputs the second use information in the second period to the image generation apparatus 1 and the image generation apparatus 1 acquires the second use information.

Here, the first period and the second period are explained. In the following explanation, the termination of the period is defined to be closer to the present time than the commencement thereof. The first period is a period of time terminating at a predetermined period before the time at which the first use information is acquired. The commencement of the first period may be set appropriately. The second period is a period of time including a range from the predetermined period before the time at which the second use information is acquired as a commencement and the time at which the second use information is acquired as a termination. For example, the termination of the first period and the commencement of the second period can be the same time.

More specifically, the second period is a period during which the meter device 3 substantially holds the data. The second period is a period of time ranging from a predetermined period before the time at which the second use information is acquired to the time at which the second use information is acquired. The second period depends on the specification of the meter device 3. It can be, for example, within the day (a predetermined period or a predetermined moment within the day) on which the second use information is acquired or it is assumed to be a period of 3 hours before the time at which the second use information is acquired. When the use information at the time at which the second use information is acquired is not included, only the use information before the time at which the second use information is acquired may be included.

The time at which the first use information is acquired may be set to be the same time at which the second use information is acquired, for example. The same time means that, for example, the time may be set so that hour or minute will be the same. That is, for example, when the time is set so that the hour will be the same, even if the minute is different, this is regarded as the same time. Furthermore, the time at which the first use information is acquired may be set to be different from the time at which the second use information is acquired. In this case, when the second period (in particular the commencement of the second period) is set, a predetermined time for setting the termination of the first period may be added to the difference in time between the time at which the first use information is acquired and the time at which the second use information is acquired.

Thus, the first period is set in a period before the second period. For example, when the second period is within the day on which the second use information is acquired, the first period is a period on or before the previous day, and when the second period is a period of 3 hours before the time at which the second use information is acquired, the first period is a period before the 3 hours. Furthermore, it is possible to set the first period first, and subsequently set the second period so as not to include the first period.

Furthermore, the communication part 12 may acquire the second use information by specifying a target period included in the second period by a user operation or the like, and in this case, the first use information is acquired by assuming that the period before the specified period is the first period. On the contrary, when the communication part 12 acquires the first use information by specifying a target period included in the first period by a user operation or the like, the second use information is acquired by assuming that he period later than the specified period is the second period.

The first period and the second period may be overlapped to each other. When the first use information and the second use information in the overlapped time are acquired, either one of the use information may be used preferentially with respect to the usage information in the overlapped period. Furthermore, when there is a difference between each piece of information in the overlapped period when comparing them, the error information may be notified to the management company or the customer facility.

The image generation apparatus 1 that has acquired the first use information and the second use information uses them together to generate an image (an electric power visualization image) on energy use.

Figure 3:
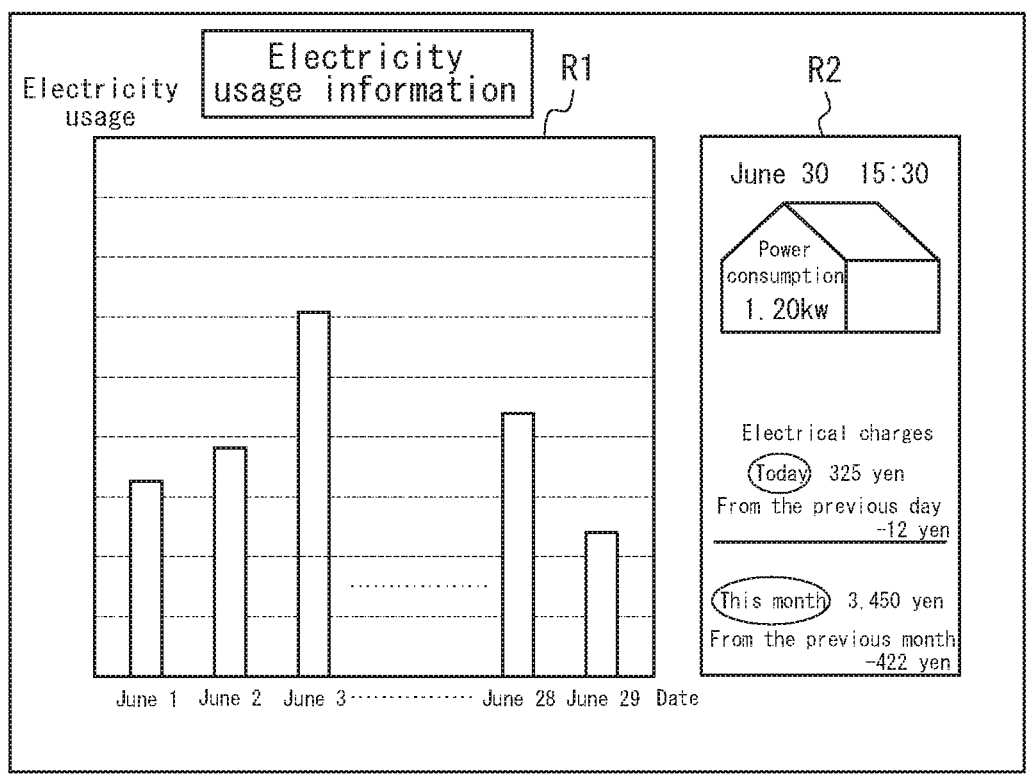
FIG. 3 is a diagram illustrating an example of an image generated by the image generation apparatus illustrated in FIG. 1.

FIG. 3 is a diagram illustrating an example of an image relating to energy use generated by the image generation apparatus 1 illustrated in FIG. 1. The region R1 is a bar graph chart generated by the controller 11 based on the first use information acquired at 15:30 of June 30. The region R1 illustrates the electricity usage per day from June 1 to June 29.

On the other hand, the region R2 is a chart generated by the controller 11 based on the second use information acquired at 15:30 of June 30. The region R2 illustrates the electricity usage at the time of 15:30, the electricity bill on June 30, the electricity bill for June, or the like.

In FIG. 3, although the information generated based on the first use information and the information generated based on the second use information are indicated in regions different from each other, they may be indicated together in one region with any method.

Furthermore, in FIG. 3, the user may specify one point of time in the past (e.g. 12:00 of May 25), and based on that the region R1 may indicate the electricity usage per day from May 1 to May 24, and the region R2 may indicate the electricity usage and the electricity bill at 12:00 of May 25 and the electricity bill for May or the like.

Figure 4:
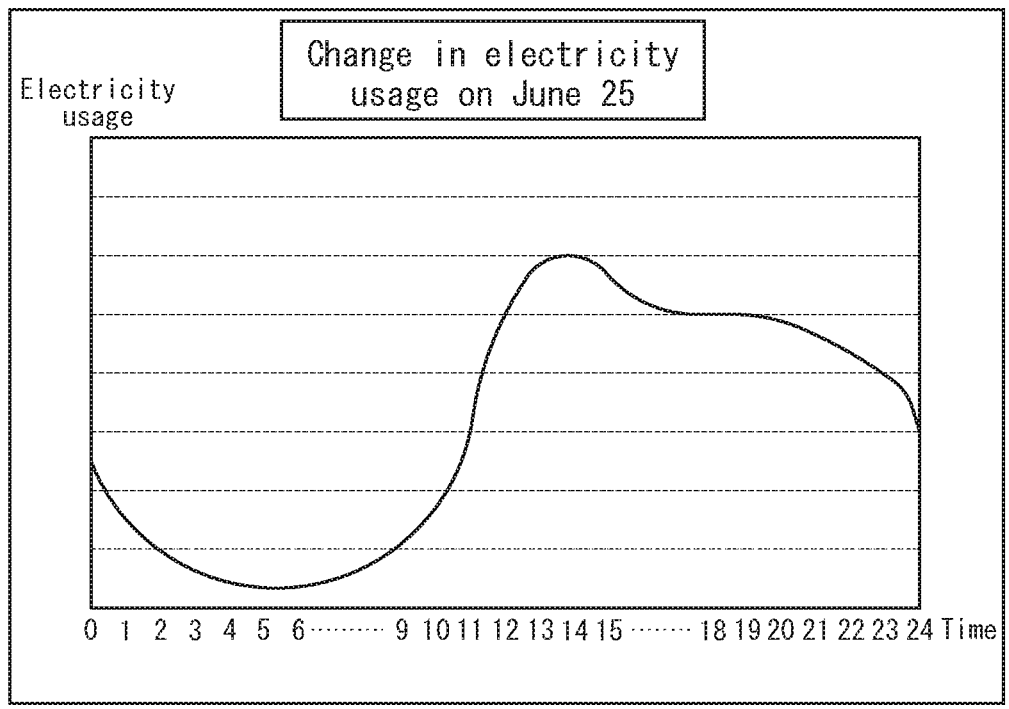
FIG. 4 is a diagram illustrating another example of an image generated by the image generation apparatus illustrated in FIG. 1.

FIG. 4 is a diagram illustrating another example of an image relating to energy use generated by the image generation apparatus 1 illustrated in FIG. 1. FIG. 4 is a graph indicated when the user chooses the bar graph for June 25 of the region R1 in FIG. 3. The graph in FIG. 4 illustrates a change in usage of electricity per minute of June 25.

[Operation Flow]

FIG. 5 is a diagram illustrating an operation flow of the image generation system according to one embodiment of this disclosure. In FIG. 5, an explanation is given by assuming that the meter device 3 outputs the second use information indirectly to the image generation apparatus 1 via the energy management apparatus 4. Furthermore, in FIG. 5, an explanation is given by assuming that an image generated by the controller 11 is displayed by the display 14.

The meter device 3 measures the energy usage (step S1). The meter device 3 outputs the measured energy usage to the energy management apparatus 4 as the second use information (step S2) and to the first server 2 as the first use information (step S3). The order of step S2 and step S3 can be reversed.

The image generation apparatus 1 connects to the second server 5 by a user operation (step S4). After connection, the second server 5 outputs a program to the image generation apparatus 1 (step S5). After acquisition of the program, the image generation apparatus 1 executes the program (step S6) and connects to the first server 2 based on the program (step S7). After connection, the image generation apparatus 1 logs in to the first server 2 by using the credentials (step S8). After login, the first server 2 outputs the first use information in the first period corresponding to the credentials to the image generation apparatus 1 (step S9).

The image generation apparatus 1 connects to the energy management apparatus 4 based on the program executed in step S6 at the same time from step S7 to step S9 or before and after these steps (step S10). After connection, the energy management apparatus 4 outputs the second use information in the second period to the image generation apparatus 1 (step S11).

Subsequently the image generation apparatus 1 generates an image relating to use of energy by using the first use information and the second use information together (step S12). The image generation apparatus 1 displays an image generated in step S12 (step S13).

When the energy management apparatus 4 acquires the second use information in step S2, the energy management apparatus 4 may log in to the meter device 3 by using the credentials stored, for example, and acquire the second use information corresponding to the credentials.

According to this embodiment, the energy management apparatus 4 may store only the second use information in the second period later than the first period, which allows decrease in a load on the database of energy management apparatus 4. Furthermore, this allows decrease in the maintenance cost of the database of energy management apparatus 4.

Furthermore, according to this embodiment, the first use information is the information collected by a management company for charging. That is, a server constructed by the management company for charging may be used as the first server 2. Thus, it is not necessary to provide a storage for the first server 2, and the first server 2 has only to output the information collected from the meter device 3 for charging to the image generation apparatus 1. Moreover, a highly accurate image can be generated by using the data accumulated by the management company for charging.

Although this disclosure has been described based on various drawings and embodiments, it is to be noted that various changes and modifications can be easily made by those skilled in the art based on this disclosure. Therefore, such changes and modifications are to be understood as included within the scope of this disclosure. For example, the functions or the like included in each member, each part, each step, or the like may be reordered in any logically consistent way. Furthermore, when this disclosure is executed as a method, components and steps may be combined into one or divided.

In the above described embodiments, although a program configured to generate an image is provided from the second server 5, a program provided by the second server 5 may be built in (stored) in the image generation apparatus 1. Moreover, the image generation apparatus 1 may be built in the energy management apparatus 4.

At least one of the first use information and the second use information may include the prediction information such as the electricity usage prediction information, power generation prediction information of solar cells, prediction information on reduction in electricity usage by demand response. Such pieces of prediction information may be calculated based on the results of electricity usage in the past and the annual weather forecast or the like.

The prediction information may include an output suppression schedule, for example. In particular, the latest schedule can be referred all the time if the output suppression schedule is included as the first use information managed by a management company such as an electric power company or the like. The output suppression schedule may be an annual schedule, for example, or may be a monthly or a weekly schedule.

The credentials may be required when the image generation apparatus 1 accesses to the second server 5. At this time, the same credentials as those used when the image generation apparatus 1 logs in to the first server 2 may be used, or a different one may be used. Furthermore, credentials may be required when the image generation apparatus 1 connects to the energy management apparatus 4. Moreover, when the energy management apparatus 4 is connected wired, it may require credentials only for the first time when it connects to the meter device 3 or authentication work itself may be omitted.

In the above described embodiment, although an explanation has been given for the occasion where credentials are used to login when the image generation apparatus 1 connects to the first server 2 and the image generation apparatus 1 connects to the meter device 3, it is apparent that credentials are used for either one of them. That is, credentials may be used only to login when connecting to the meter device 3 or only to login when connecting to the first server 2.

Many aspects of this disclosure are indicated as a series of operations executed either by a computer system that can execute program instructions or by other hardware. Examples of a computer system and other hardware include a versatile computer, a personal computer (PC), a dedicated computer, a workstation, a Personal Communications System (PCS), a cellular phone, a cellular phone provided with a data processing function, an RFID (Radio Frequency Identifier) receiver, a game console, an electronic notepad, a laptop computer, a Global Positioning System (GPS) receiver, or other programmable data processing device. In each embodiment, it should be noted that a variety of operations are executed by a dedicated circuit (for example, individual logical gates interconnected in order to execute a particular function) implemented by program instructions (software), or by a logical block, program module, or the like executed by one or more processors. The one or more processors that execute a logical block, program module, or the like are, for example, one or more of a microprocessor, central processing unit (CPU), Application Specific Integrated Circuit (ASIC), Digital Signal Processor (DSP), Programmable Logic Device (PLD), Field Programmable Gate Array (FPGA), processor, controller, microcontroller, microprocessor, electronic device, other device designed to be capable of executing the functions disclosed here, and/or a combination of any of the above. The embodiments disclosed here are, for example, implemented by hardware, software, firmware, middleware, microcode, or a combination of any of these. The instructions may be program code or a code segment for executing the necessary tasks. The instructions may be stored on a machine-readable, non-transitory storage medium or other medium. The code segment may indicate a combination of any of the following: procedures, functions, subprograms, programs, routines, subroutines, modules, software packages, classes, instructions, data structures, or program statements. The code segment may transmit and/or receive information, data arguments, variables, or storage content to or from another code segment or hardware circuit in order for the code segment to connect to another code segment or hardware circuit.

Examples of the network used herein include, unless otherwise specified, the Internet, ad hoc network, local area network (LAN), wide area network (WAN), metropolitan area network (MAN), cellular network, wireless wide area network (WWAN), wireless personal area network (WPAN), public switched telephone network (PSTN), terrestrial wireless network, other networks, or a combination of any of these. The components of the wireless network include, for example, an access point (e.g. Wi-Fi access point) and a femtocell. Furthermore, the wireless communicator may be connected to a wireless network using Wi-Fi, Bluetooth®, cellular communication technology (e.g. Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA)), or any other wireless technology and/or technological standard. The network may employ one or more technologies. Examples of such technologies include Universal Mobile Telecommunications System (UTMS), Long Term Evolution (LTE), Evolution-Data Optimized or Evolution-Data Only (EV-DO), Global System for Mobile communications (GSM®), Worldwide Interoperability for Microwave Access (WiMAX), Code Division Multiple Access-2000 (CDMA-2000), and Time Division Synchronous Code Division Multiple Access (TD-SCDMA).

The circuit structure of a communicator or the like provides functionality by using any of various wireless communication networks such as WWAN, WLAN, and WPAN. The WWAN can be a CDMA network, a TDMA network, a FDMA network, an OFDMA network, a SC-FDMA network, or the like. The CDMA network may implement one or more radio access technologies (RATs) such as CDMA2000, wideband-CDMA (W-CDMA), or the like. CDMA2000 includes IS-95, IS-2000, and IS-856 standards. The TDMA network may implement GSM®, Digital Advanced Phone System (D-AMPS), or other RAT. GSM® and W-CDMA are described in documents from a consortium named 3rd Generation Partnership Project (3GPP). CDMA2000 is described in documents from a consortium named 3rd Generation Partnership Project 2 (3GPP2). The WLAN may be an IEEE 802.11x network. The WPAN may be a Bluetooth® network, an IEEE 802.15x network, or other type of network. CDMA may be implemented as a wireless technology such as Universal Terrestrial Radio Access (UTRA) or CDMA2000. TDMA may be implemented as a wireless technology such as GSM®/General Packet Radio Service (GPRS)/Enhanced Data Rates for GSM® Evolution (EDGE). OFDMA may be implemented as a wireless technology such as Institute of Electrical and Electronics Engineers (IEEE) 802.11 (Wi-Fi), IEEE 802.16 (WiMAX), IEEE 802.20, or Evolved UTRA (E-UTRA) or the like. Such technologies may be used for any combination of WWAN, WLAN, and/or WPAN. Such technologies may also be implemented to use an ultra mobile broadband (UMB) network, a high rate packet data (HRPD) network, a CDMA20001X network, GSM®, Long-Term Evolution (LTE) or the like.

The machine-readable non-temporary storage medium may further be formed as a computer-readable tangible carrier (medium) formed in the categories of solid-state storage, magnetic disk, and optical disk. Such a medium stores an appropriate set of computer instructions, such as program modules, and data structures for causing a processor to carry out the techniques disclosed herein. Examples of the computer-readable medium include an electrical connection having one or more wires, magnetic disk storage medium, magnetic cassette, magnetic tape, other magnetic and optical storage devices (e.g. compact disk (CD), LaserDisc®, digital versatile disc (DVD), Floppy® disk, Blu-ray Disc, portable computer disk, random access memory (RAM), read-only memory (ROM), EPROM, EEPROM, flash memory, other rewritable and programmable ROM, other tangible storage medium capable of store, and a combination of any of these. Memory may be provided inside and/or outside a processor/processing unit. The term "memory" used herein indicates any type of memory such as long-term memory, short-term memory, volatile, nonvolatile, and other memory, and the number of memories or the types of media are not limited.

It should be noted that the system is disclosed herein as having various modules and/or units for executing specific functions, and these modules and units are schematically illustrated to simplify the description of its functionality, and do not necessarily represent specific hardware and/or software. In this regard, the modules, units, and other components may be hardware and/or software implemented to substantially execute the specific functions described herein. Various functions of different components may be any combination or separate ones of hardware and/or software, and may be used separately or in combination. Input/output (I/O) devices or user interfaces including, but not limited to, a keyboard, a display, a touch-screen, and a pointing device may be connected to the system directly or via intervening I/O controllers. Thus, the disclosed various aspects may be embodied in many different forms, and all such embodiments are within the scope of the disclosure.

REFERENCE SIGNS LIST

1 Image generation apparatus
11 Controller
12 Communication part
13 Storage
14 Display
2 First server
3 Meter device
4 Energy management apparatus
5 Second server

The invention claimed is:

1. An image generation apparatus comprising:
a communication part configured to acquire first use information on energy usage in a first period from a first server that has information on the energy usage at a customer facility and second use information in a second period later than the first period from a meter device that is installed in the customer facility and measures the energy usage, the second use information being acquired without the first server; and
a controller configured to generate an image relating to use of energy by using the first use information and the second use information together.

2. The image generation apparatus according to claim 1, wherein the controller is further configured to control the communication part to:
communicatively connect to a second server to download a program configured to generate the image; and
execute the program to generate the image.

3. The image generation apparatus according to claim 2, wherein the program includes tag information that specifies a destination including the first server and a script.

4. The image generation apparatus according to claim 1, wherein the controller is further configured to control the communication part to:
communicatively connect to a second server to download a program configured to communicate with an energy management apparatus or the meter device; and
execute the program to communicatively connect to the energy management apparatus or meter device to acquire the second use information.

5. The image generation apparatus according to claim 1, wherein the first period consists of a first period of time terminating at a predetermined time before a time at which the first use information is acquired, and wherein the second period comprises a second period of time from the predetermined time to a time at which the second use information is acquired.

6. The image generation apparatus according to claim 5, wherein the second period consists of the second period of time, such that the first period of time and the second period of time do not overlap.

7. The image generation apparatus according to claim 1, wherein the controller, when acquiring the first use information and the second use information, specifies at least one of a target time period included in the first period or a target time period included in the second period.

8. The image generation apparatus according to claim 1, wherein the controller, when acquiring the first use information and the second use information, specifies a target time period included in the first period and a target time period included in the second period, so that the first period and the second period overlap each other.

9. The image generation apparatus according to claim 1, further comprising a storage configured to store credentials to the first server, wherein the controller is configured to control the communication part to log in to the first server by using the credentials before acquiring the first use information.

10. The image generation apparatus according to claim 1, further comprising a storage configured to store credentials to an energy management apparatus or the meter device, wherein the controller is configured to control the communication part to log in to the energy management apparatus or meter device by using the credentials before acquiring the second use information.

11. The image generation apparatus according to claim 1, further comprising a storage that stores credentials to the first server and an energy management apparatus or the meter device, wherein the controller is configured to control the communication part to:
log in to the first server by using the credentials before acquiring the first use information; and
log in to the energy management apparatus or meter device by using the credentials before acquiring the second use information.

12. The image generation apparatus according to claim 11, wherein the credentials to the first server and the credentials to the energy management apparatus or meter device are identical.

13. The image generation apparatus according to claim 12, wherein the credentials comprise a customer management number at a management company that manages the first server.

14. The image generation apparatus according to claim 1, further comprising a display configured to display the image.

15. The image generation apparatus according to claim 1, wherein the communication part is configured to:
- communicatively connect to the first server; and
- communicatively connect to an energy management apparatus or the meter device to acquire the second use information.

16. The image generation apparatus according to claim 1, wherein the first use information is information collected by the management company for charging.

17. The image generation apparatus according to claim 1, wherein at least one of the first use information or the second use information includes at least one of an electricity usage suppression amount or an output suppression amount.

18. An image generation method comprising the steps of:
- acquiring, by a communication part, first use information on energy usage in a first period from a first server that has information on the energy usage at a customer facility and second use information in a second period later than the first period from a meter device that is installed in the customer facility and measures the energy usage, the second use information being acquired without the first server; and
- generating, by a controller, an image relating to use of energy by using the first use information and the second use information together.

19. The image generation method according to claim 18, comprising, by the controller, setting the first period after setting the second period.

20. A non-transitory computer-readable storage medium storing instructions allowing a computer to execute:
- acquiring first use information on energy usage in a first period from a first server that has information on the energy usage at a customer facility and acquiring second use information in a second period later than the first period from a meter device that is installed in the customer facility and measures the energy usage, the second use information being acquired without the first server; and
- generating an image relating to use of energy by using the first use information and the second use information together.

* * * * *